United States Patent
Uozumi et al.

(10) Patent No.: US 7,905,442 B2
(45) Date of Patent: Mar. 15, 2011

(54) FILAMENT WINDING APPARATUS

(75) Inventors: Tadashi Uozumi, Kyoto (JP); Hiroki Takashima, Kyoto (JP); Motohiro Tanigawa, Kyoto (JP)

(73) Assignee: Murata Machinery, Ltd, Kyoto (JP)

( * ) Notice: Subject to any disclaimer, the term of this patent is extended or adjusted under 35 U.S.C. 154(b) by 338 days.

(21) Appl. No.: 12/190,479

(22) Filed: Aug. 12, 2008

(65) Prior Publication Data

US 2009/0065622 A1    Mar. 12, 2009

(30) Foreign Application Priority Data

Sep. 7, 2007   (JP) ................. 2007-232975

(51) Int. Cl.
  *B21C 47/14* (2006.01)
(52) U.S. Cl. ............... 242/439.5; 242/440.1; 242/445.1
(58) Field of Classification Search ............... 242/434.9, 242/438, 438.1, 439.5, 440.1, 441.1, 441.2, 242/444, 445.1
  See application file for complete search history.

(56) References Cited

U.S. PATENT DOCUMENTS

| | | | | |
|---|---|---|---|---|
| 2,782,138 A | * | 2/1957 | Olson | 156/431 |
| 4,251,036 A | * | 2/1981 | McLain | 242/444 |
| 4,610,403 A | * | 9/1986 | Goekler et al. | 242/439.5 |
| 5,133,510 A | * | 7/1992 | Davis et al. | 242/438.1 |
| 5,720,445 A | * | 2/1998 | Sakurai et al. | 242/438.1 |

FOREIGN PATENT DOCUMENTS

| | | |
|---|---|---|
| JP | 09277391 A | 10/1997 |
| JP | 2004-148776 | 5/2004 |
| JP | 2004209923 A | 7/2004 |
| JP | 2005042206 A | 2/2005 |
| JP | 2006082276 A | 3/2006 |
| JP | 2007210182 A | 8/2007 |

OTHER PUBLICATIONS

Japanese language office action and its English language translation for corresponding Japanese application 2007232975 lists the reference above.

* cited by examiner

*Primary Examiner* — Emmanuel M Marcelo
(74) *Attorney, Agent, or Firm* — Hogan Lovells US LLP

(57) ABSTRACT

A filament winding apparatus includes a hoop winding device and a helical winding device. The hoop winding device includes a disc-shaped wrapping table, a drive mechanism that rotatably drives the wrapping table, four bobbins supported along a peripheral edge of the wrapping table, and a guide member that moves and guides a fiber bundle fed from the bobbin to a mandrel arranged in an insertion hole of the wrapping table. The bobbin is axially supported in a freely rotatable manner with a chuck of a holder fixed to the wrapping table. A ratchet mechanism, which prevents over-rotation in a fiber bundle feeding direction of the bobbin, is arranged between the holder and the chuck.

11 Claims, 9 Drawing Sheets

FILAMENT WINDING APPARATUS

RELATED APPLICATIONS

This application claims the benefit of priority under 35 USC 119 of Japanese patent application no. 2007-232975, filed on Sep. 7, 2007, the entire contents of which are incorporated herein by reference.

BACKGROUND OF THE INVENTION

1. Field of the Invention

The present invention relates to a filament winding apparatus equipped with a hoop winding device and a helical winding device and, in particular, to an improved hoop winding device.

2. Description of the Related Art

When forming a pressure container by a filament winding method, a fiber bundle is hoop wound or helical wound on a mandrel to form a reinforcement layer (see Japanese Laid-Open Patent Publication No. 10-119138, paragraphs 0022 to 0023, FIG. 1). In a conventional general filament winding apparatus, the fiber bundle is hoop wound or helical wound with one type of winding head.

As described above, hoop winding and helical winding are carried out with one type of winding head in a conventional filament winding apparatus, and thus a great amount of time is inevitably required for the process of winding the fiber bundle on the mandrel, which becomes a great barrier in manufacturing pressure containers and the like. In particular, since a great amount of time is required for hoop winding, it is desirable to increase the speed of the hoop winding process.

SUMMARY OF THE INVENTION

In order to overcome the problems described above, the present invention provides a filament winding apparatus equipped with a hoop winding device that efficiently performs the hoop winding process in a short period of time.

A filament winding apparatus of the present invention is equipped with a hoop winding device and a helical winding device. The hoop winding device includes a rotatably-driven disc-shaped wrapping table, a plurality of bobbins supported along a peripheral edge of the wrapping table, and a guide member that moves and guides a fiber bundle fed from the bobbin to a mandrel arranged in an insertion hole of the wrapping table.

The bobbins are arranged at equal intervals on a circumference having a center of rotation of the wrapping table as a center. A tensor that adjusts a tensile force of the fiber bundle is arranged on the wrapping table facing a movement path of the fiber bundle between the bobbin and the mandrel.

An application device that applies resin to the fiber bundle, and an adhesion sensor that detects an adhesion state of the resin on the fiber bundle, are arranged on the wrapping table facing the movement path of the fiber bundle between the tensor and the mandrel.

The filament winding apparatus of the present invention is equipped with a hoop winding device and a helical winding device, so that a hoop winding process and a helical winding process can be efficiently performed in dedicated devices. The hoop winding device is configured by the rotatably-driven wrapping table, a plurality of bobbins that rotate with the wrapping table, and the guide member that moves and guides the fiber bundle to the mandrel. The plurality of fiber bundles are simultaneously wound to the mandrel at high speed by rotatably driving the wrapping table. The hoop winding process can be performed with the helical winding device and the mandrel connected with the fiber bundle and without rotating the mandrel by winding the fiber bundle to the mandrel while rotatably driving the wrapping table, whereby the winding of the fiber bundle with respect to the mandrel can be efficiently performed at high speed. Therefore, the hoop winding process can be terminated in a short period of time, the productivity of a winding product such as a pressure container is enhanced, and manufacturing costs are saved relative to a conventional device that hoop winds or helical winds the fiber bundle with a single winding head.

According to the hoop winding device in which the bobbins are arranged at equal intervals on a circumference having a center of rotation of the wrapping table as a center, and a tensor that adjusts a tensile force of the fiber bundle is arranged on the wrapping table facing a movement path of the fiber bundle between the bobbin and the mandrel, an appropriate back tension is applied to the fiber bundle wound to the mandrel. Thus, even when winding the fiber bundle to the mandrel at high speed, the fiber bundle is constantly applied with an appropriate tensile force and is wrapped to the mandrel, and a hoop winding process of high quality is performed.

According to the hoop winding device in which an application device that applies resin to the fiber bundle, and an adhesion sensor that detects an adhesion state of the resin on the fiber bundle, are arranged on the wrapping table facing the movement path of the fiber bundle, the chances of contact between the fiber bundle applied with resin and the guide member are minimized. Thus, the resin adhesion amount with respect to the fiber bundle is stabilized, and furthermore, the trouble necessary for maintenance of the guide member that moves and guides the fiber bundle is alleviated.

Other features, elements, processes, steps, characteristics and advantages of the present invention will become more apparent from the following detailed description of embodiments of the present invention with reference to the attached drawings.

DETAILED DESCRIPTION OF EMBODIMENTS OF THE INVENTION

Figure 1:
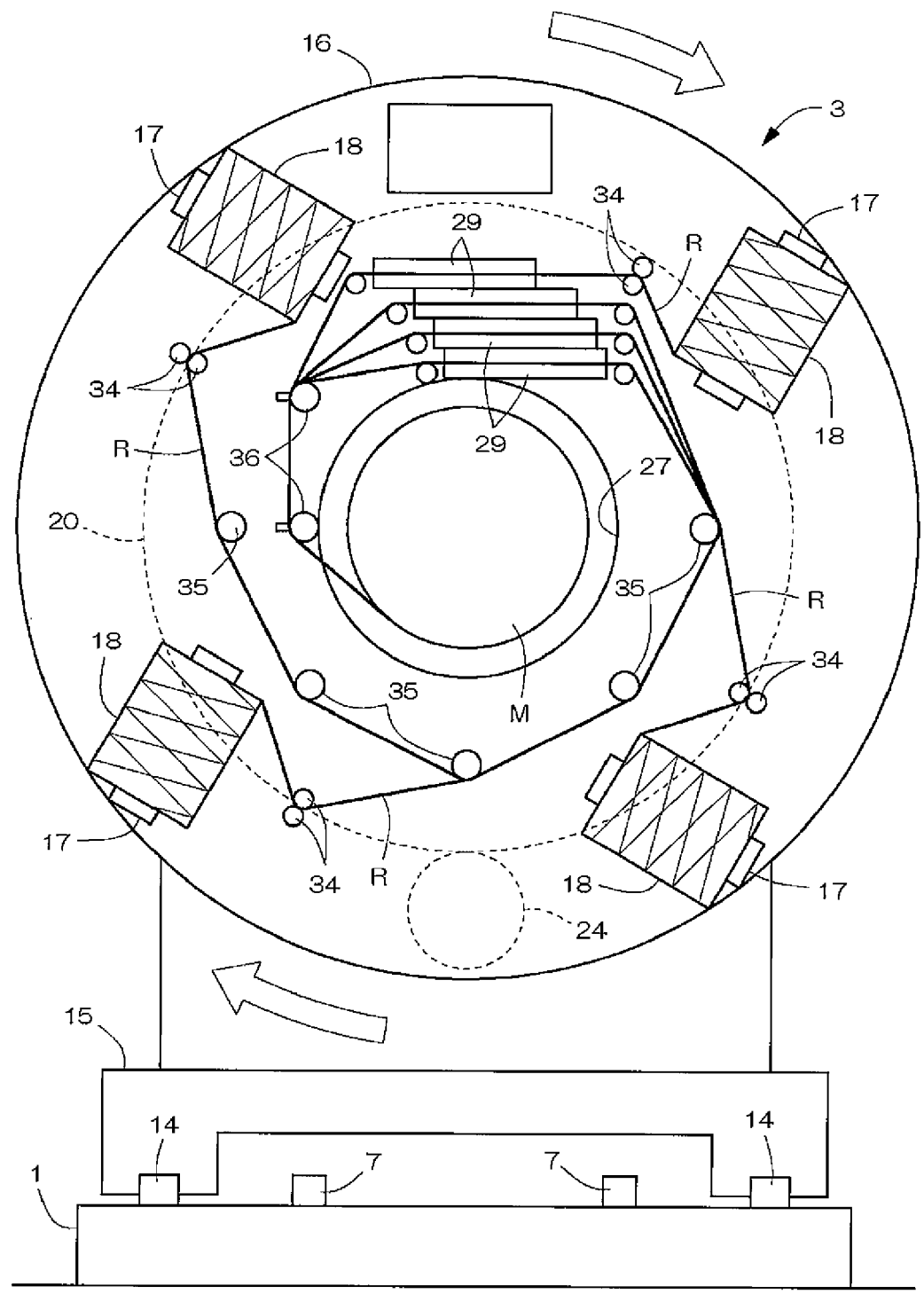
FIG. 1 is a cross-sectional view of a hoop winding device taken along line A-A of FIG. 2.
Figure 2:
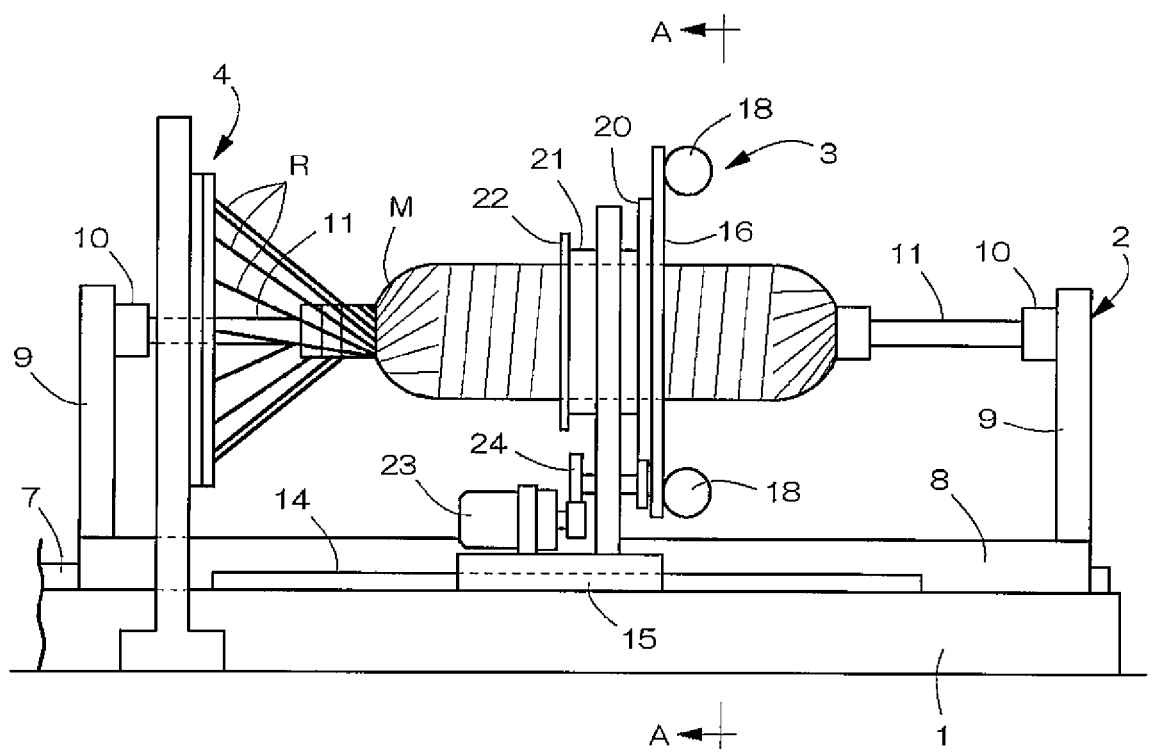
FIG. 2 is a front view showing a schematic relationship between a mandrel and a winding device.

FIGS. 1-8 show examples of a filament winding apparatus according to the present invention. As illustrated in FIG. 2, the filament winding apparatus is configured by a fiber bundle supply structure and a winding device. The winding device comprises a supporting board 2 that is arranged on an upper part of a mount 1, which extends lengthwise in a left and right direction, and that supports a mandrel M; a hoop winding device 3; a helical winding device 4; and a mandrel replacing device. The supporting board 2 and the hoop winding device 3 are driven by a drive mechanism in a freely reciprocating manner along a longitudinal direction of the mount 1. The helical winding device 4 is fixed at a central position of the mount 1, and feeds and guides a fiber bundle R fed from a group of quills supported by the fiber bundle supply structure to the mandrel M.

The mandrel M, in a case where the final product is a pressure container, is formed to a container shape with a metal material such as high strength aluminum material and stainless material, a resin molded article, or the like. In this example, the mandrel M integrally includes a cylindrical part at the center, dome parts continuing at both ends of the cylindrical part, and mouth parts arranged in a projecting manner at the apexes of the dome parts, as shown in FIG. 2. The fiber bundle R includes a bundle of glass fibers or carbon fibers. A thermosetting plastic material is impregnated in advance in the fiber bundle R wound to the quill of the fiber bundle supply structure. After impregnating the resin in the fiber bundle R fed from the quill, it may be supplied to the helical winding device 4.

The supporting board 2 comprises a base 8 that is moved and guided by a rail 7 of the mount 1, supporting arms 9 arranged in an upstanding manner at both side ends of the base 8, and chucks 10 arranged on opposing faces at the upper ends of the supporting arms 9. The supporting arms 9 are assembled such that they can be switched from an upstanding position to a lying position with respect to the base 8 in order to facilitate the replacement of the mandrel M. Attachment jigs 11 are fixed on the left and right sides of the mandrel M and are held and supported by the chuck 10. One chuck 10 is rotatably driven with a drive structure. The left and right attachment jigs 11 are supported with the mandrel replacing device. When the winding process is complete the mandrel M can be taken out by opening the chuck 10 in this state and laying the left and right supporting arms 9 in an outwardly opened manner. A new mandrel M can be loaded to the supporting board 2 using these procedures in reverse.

Figure 3:
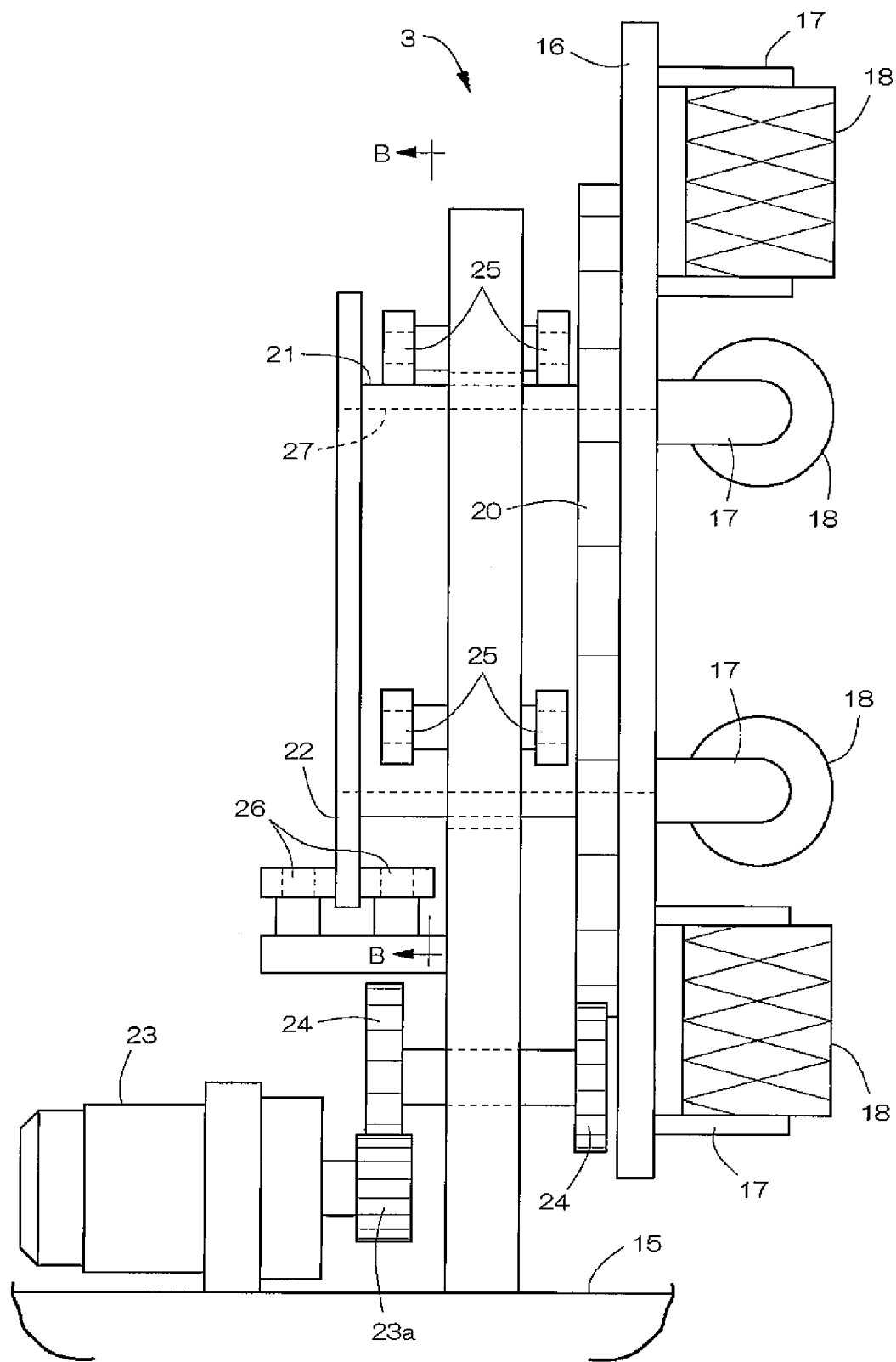
FIG. 3 is a front view of the hoop winding device.

As shown in FIG. 3, the main structures of hoop winding device 3 include a frame 15 moved and guided by a rail 14 of the mount 1, a disc-shaped wrapping table 16 supported in a freely rotating manner by the frame 15, and a drive mechanism that rotatably drives the wrapping table 16. The supply structure of the fiber bundle R is arranged on one side of the wrapping table 16, and the drive mechanism is arranged on the other side. The supply structure of the fiber bundle R comprises bobbins 18 supported by four holders 17 equally arranged along the peripheral edge of the table 16, and a guide member that moves and guides the fiber bundle R fed from the bobbin 18 to the mandrel M.

Figure 4:
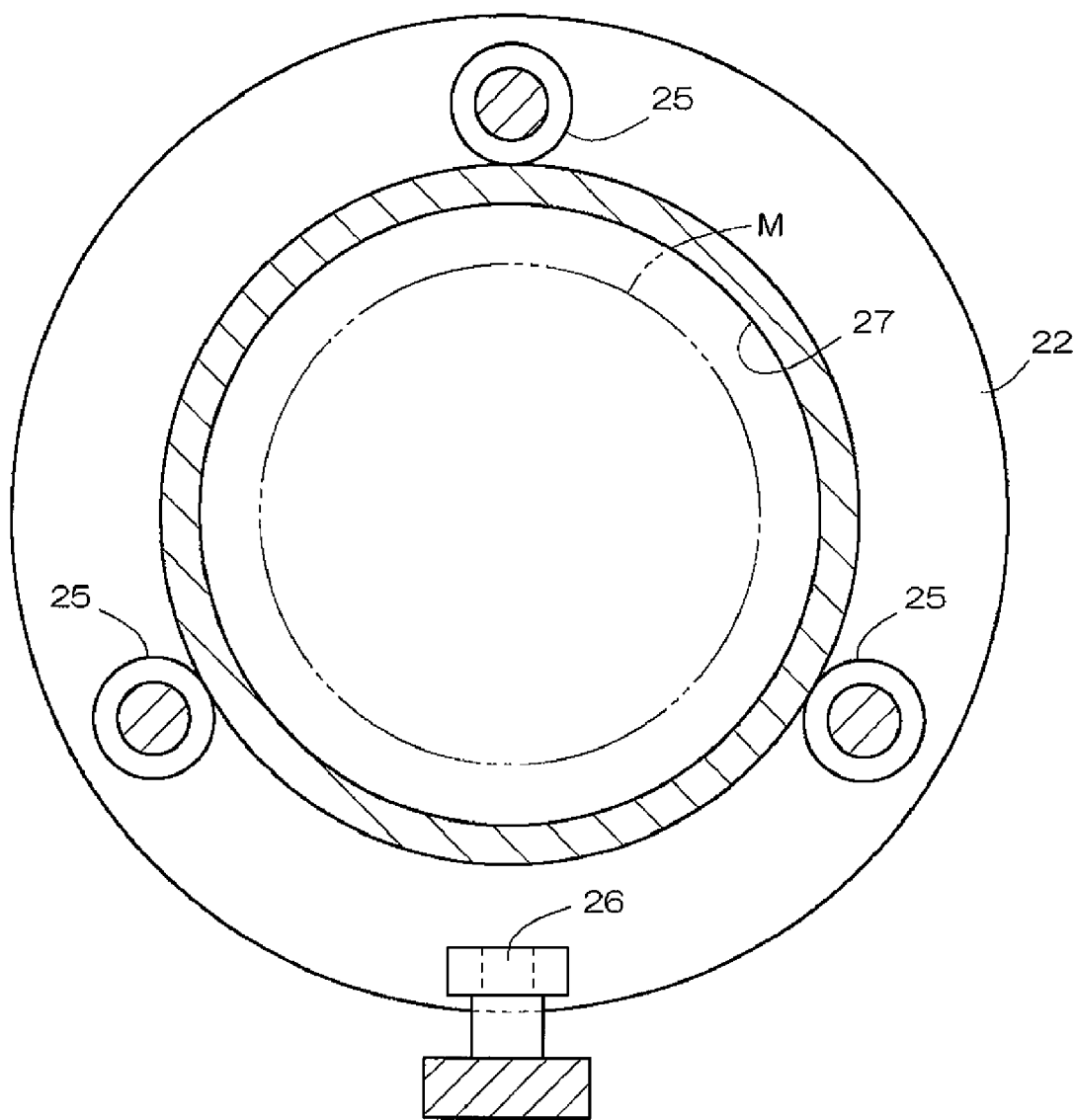
FIG. 4 is a cross-sectional view of the hoop winding device taken along line B-B of FIG. 3.

The drive mechanism comprises a large diameter gear 20 fixed on one side of the wrapping table 16, and driving gear 23a and intermediate gear 24 which transmit a motor power to the gear 20. A tubular shaft 21 is fixed on the same side of the wrapping table 16, and a flange 22 is arranged at a projecting end of the tubular shaft 21. As shown in FIG. 4, the tubular shaft 21 is supported in a freely rotating manner by three bearings 25 fixed on a vertical wall of the frame 15. Both sides of the flange 22 are sandwiched and held by a pair of freely idling guide rollers 26, so that the wrapping table 16 and the tubular shaft 21 are regulated from freely moving in an axis center direction. The wrapping table 16 and the tubular shaft 21 are formed with an insertion hole 27 provided to arrange the mandrel M to cross each other.

Figure 5:
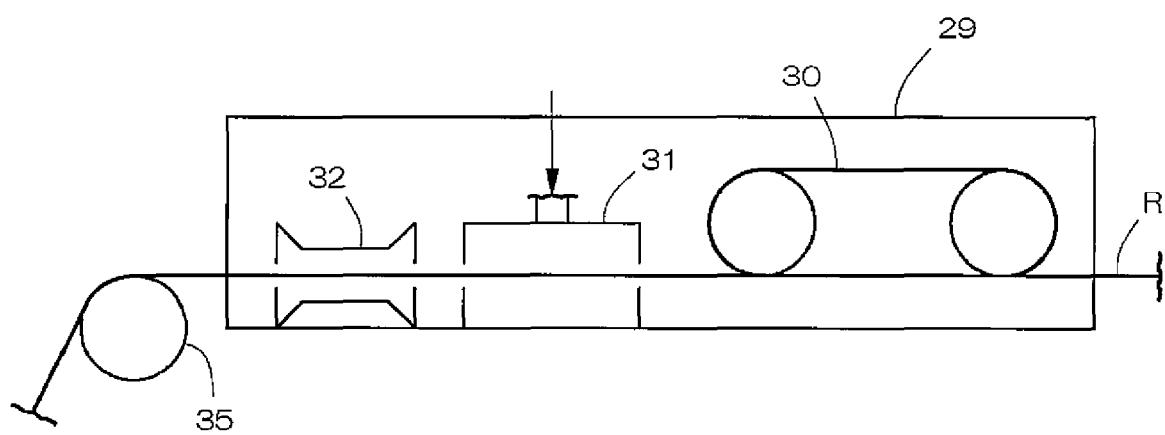
FIG. 5 is an explanatory view schematically showing a preparation unit.

As shown in FIG. 1, a preparation unit 29 is arranged on a movement path of the fiber bundle R from the bobbin 18 to the mandrel M. The preparation unit 29 is arranged in a concentrated manner at one location of the wrapping table 16. As shown in FIG. 5, a tensor 30, a resin application device 31, and a resin adhesion sensor 32 are arranged inside the preparation unit 29. Tensor 30, resin application device 31, and resin adhesion sensor 32 are arranged in order of description from the bobbin 18 side towards the mandrel M side. The tensor 30 applies a predetermined tensile force on the fiber bundle, and the resin application device 31 applies resin on the fiber bundle R. The resin adhesion sensor 32 detects the adhesion state of resin with respect to the fiber bundle R. The wrapping task is stopped when the resin adhesion sensor 32 detects adhesion failure of the resin.

Figure 6:
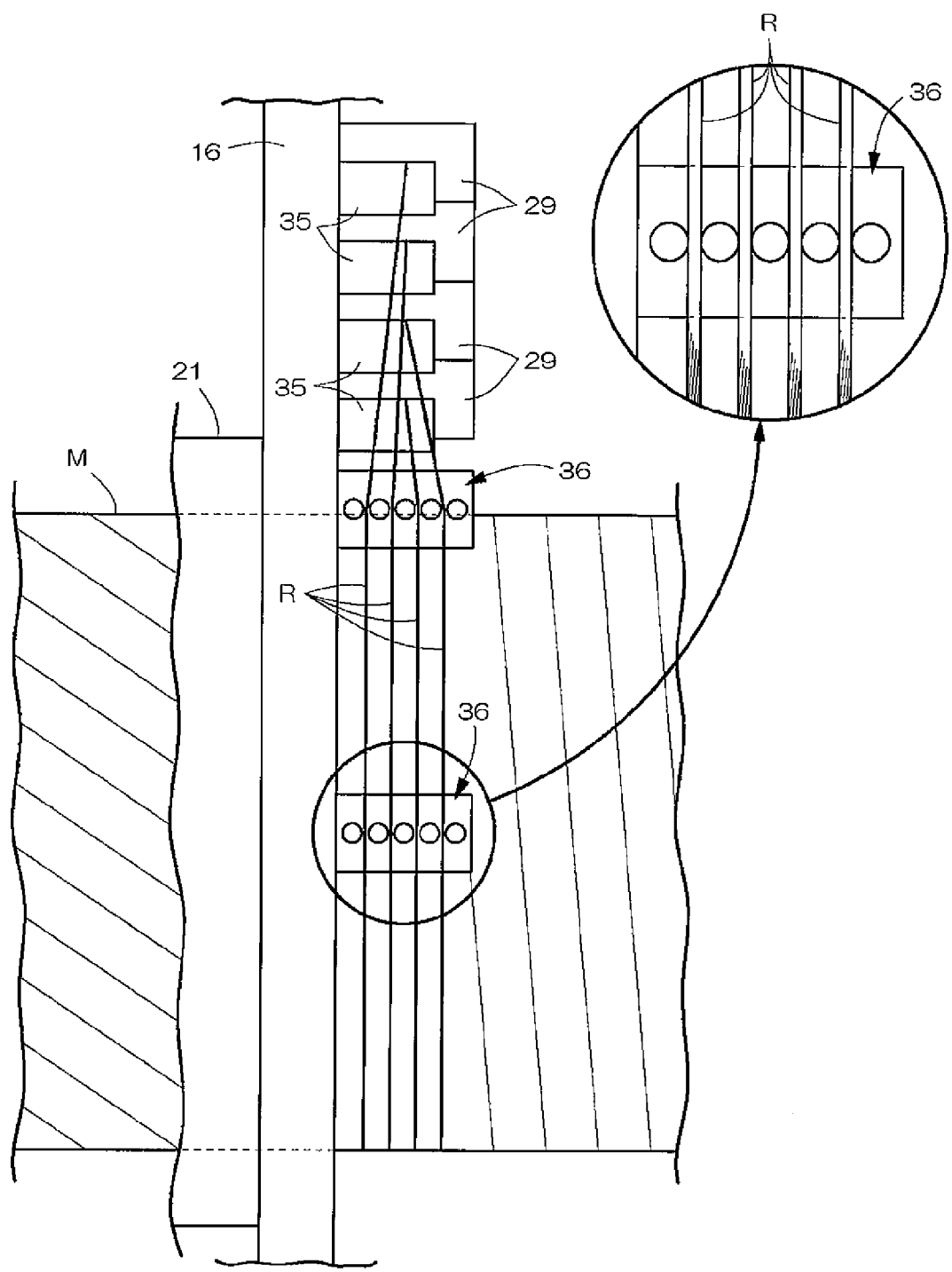
FIG. 6 is an explanatory view showing a guide structure of a fiber bundle.

The guide member that moves and guides the fiber bundle R comprises an introducing roller 34, a group of guide rollers 35, and a roller unit 36 (see FIG. 6). The introducing roller 34 and the guide roller 35 surround the periphery of the insertion hole 27 in a spiral form, turn and guide the fiber bundle R fed from each bobbin 18, and introduce and guide the same to the preparation unit 29. The roller unit 36 moves and guides the fiber bundle R which has passed through the preparation unit 29 towards the mandrel M in a parallel orientation.

Figure 7:
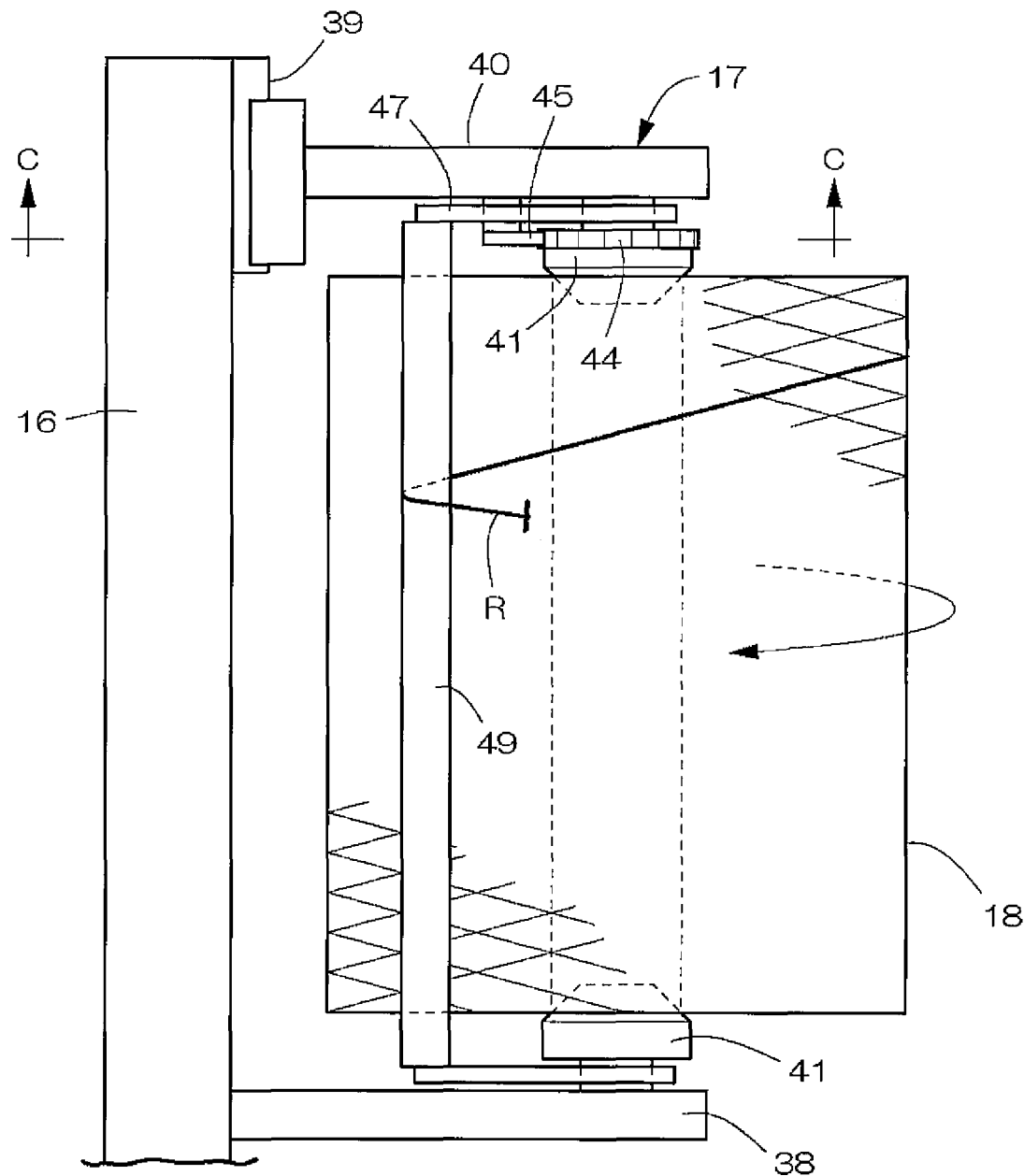
FIG. 7 is a front view showing a supporting structure of a bobbin.

As shown in FIG. 7, the holder 17 comprises a fixed arm 38 fixed to the wrapping table 16, a movable arm 40 supported in a freely reciprocating manner on a slide board 39 fixed to the wrapping table 16, and chucks 41 arranged facing the arms 38, 40. The chuck 41 is axially supported in a freely rotating manner by the fixed arm 38 and the movable arm 40 by way of a supporting shaft and a bearing 42. Therefore, the bobbin 18 can be supported in a freely rotating manner by sandwiching both ends of a winding core of the bobbin 18 with upper and lower chucks 41. A new bobbin 18 can be replaced and attached by slide operating the movable arm 40 in a direction of moving away from the fixed arm 38 along the slide board 39 and switching the chuck 41 to an open orientation.

Figure 8:
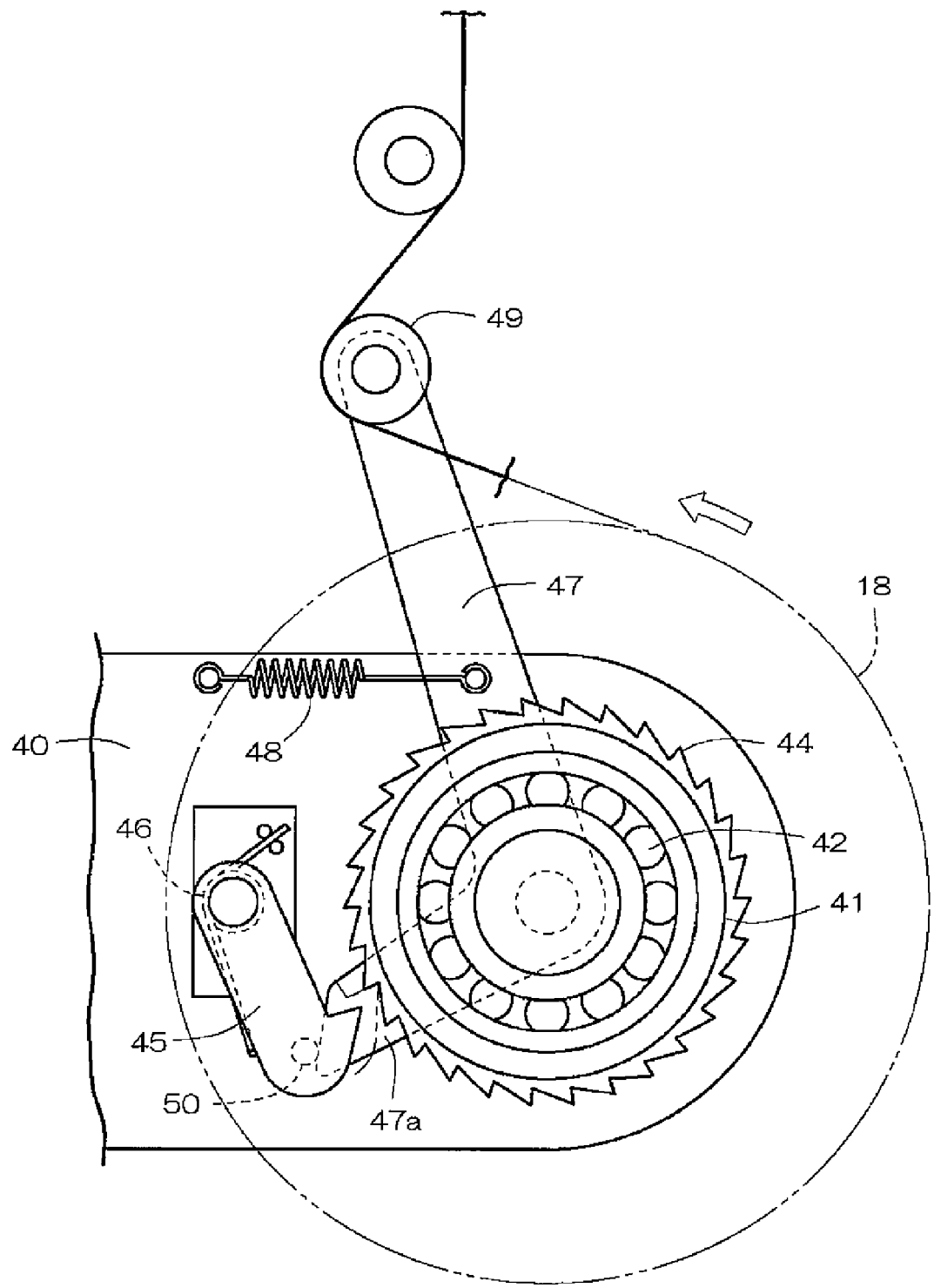
FIG. 8 is a cross sectional view taken along line C-C of FIG. 7.

A ratchet mechanism, which prevents the bobbin 18 from overly rotating in a direction of feeding the fiber bundle, is arranged between the movable arm 40 and the chuck 41 on the same arm side. As shown in FIG. 8, the ratchet mechanism comprises a ratchet wheel 44 that rotates with the chuck 41, a ratchet nail 45 axially supported in a pivoting manner by the movable arm 40, and a torsion coil spring 46 that pivots and biases the ratchet nail 45 towards the ratchet wheel 44. An L-shaped guide lever 47 is axially supported in a pivoting manner with a chuck shaft and is pivot biased with the spring 48 to disengage the ratchet nail 45 against the biasing force of the spring 46. A guide roller 49 is axially supported at a distal end of one arm of the guide lever 47. The fiber bundle R fed from the bobbin 18 is wrapped around the guide roller 49, and is then fed out.

The ratchet mechanism pivots guide lever 47 against the biasing force of the spring 48 with an increase in tensile force of the fiber bundle R pulled out from the bobbin 18. At the same time, an interlock arm 47a of the guide lever 47 displaces a pin 50 arranged on the ratchet nail 45 against the biasing force of the spring 46. The engagement of the ratchet nail 45 and the ratchet teeth is thereby released, so that the bobbin 18 can be rotated and the fiber bundle R can be fed out. As the tensile force acting on the fiber bundle R decreases with the feeding of the fiber bundle R, the guide lever 47 is pulled back by the spring 48, and in conjunction therewith, the ratchet nail 45 returns in a pivoting manner and engages the ratchet teeth. The fiber bundle R is thus fed from the bobbin 18 while the ratchet nail 45 is repeatedly engaged/disengaged with respect to the ratchet wheel 44. Therefore, the bobbin 18 will not be rotated in excess in a feeding direction by the rotation inertia force, and the fiber bundle R will not be pulled out from the bobbin 18 in excess and sag. The feeding direction of the fiber bundle R is shown with an arrow in FIG. 7 and FIG. 8.

The filament wiring apparatus configured as described above forms a reinforcement layer at the periphery of the mandrel M by repeatedly and alternately performing the hoop winding by the hoop winding device 3 and the helical winding by the helical winding device 4 with respect to the mandrel M. Specifically, as shown in FIG. 2, the supporting board 2 is moved so that the entire mandrel M projects to one side of the helical winding device 4, and the supporting board 2 is gradually slided and moved while rotating the wrapping table 16 at high speed with a motor 23 in the above state to form a hoop winding layer. A helical winding layer may be formed by rotating and displacing the mandrel M with the chuck 10 by a small amount while reciprocating the supporting board 2 with the hoop winding device 3 proximate to the helical winding device 4.

When forming the hoop winding layer, the fiber bundles R fed from four bobbins 18 are simultaneously wound to the peripheral surface of the mandrel M at high speed. Thus, the hoop winding process can be efficiently performed, and the reinforcement layer can be formed on the outer peripheral surface of the mandrel M in a short period of time. Here, the mandrel M simply reciprocates with the supporting board 2 and does not rotate, and thus the fiber bundle R connecting the helical winding device 4 and the mandrel M will not break. When the winding process is complete, the mandrel M is detached from the supporting board 2 and sent to the next heating process. A new mandrel is loaded in the supporting board 2, and the fiber bundle R is again wrapped around. In the heating process, the molten resin attached to the resin fiber R is thermally cured, thereby curing the reinforcement layer. Finally, the attachment jig 11 is detached from the mandrel M, and a pre-stage body of the pressure container is obtained.

Figure 9:
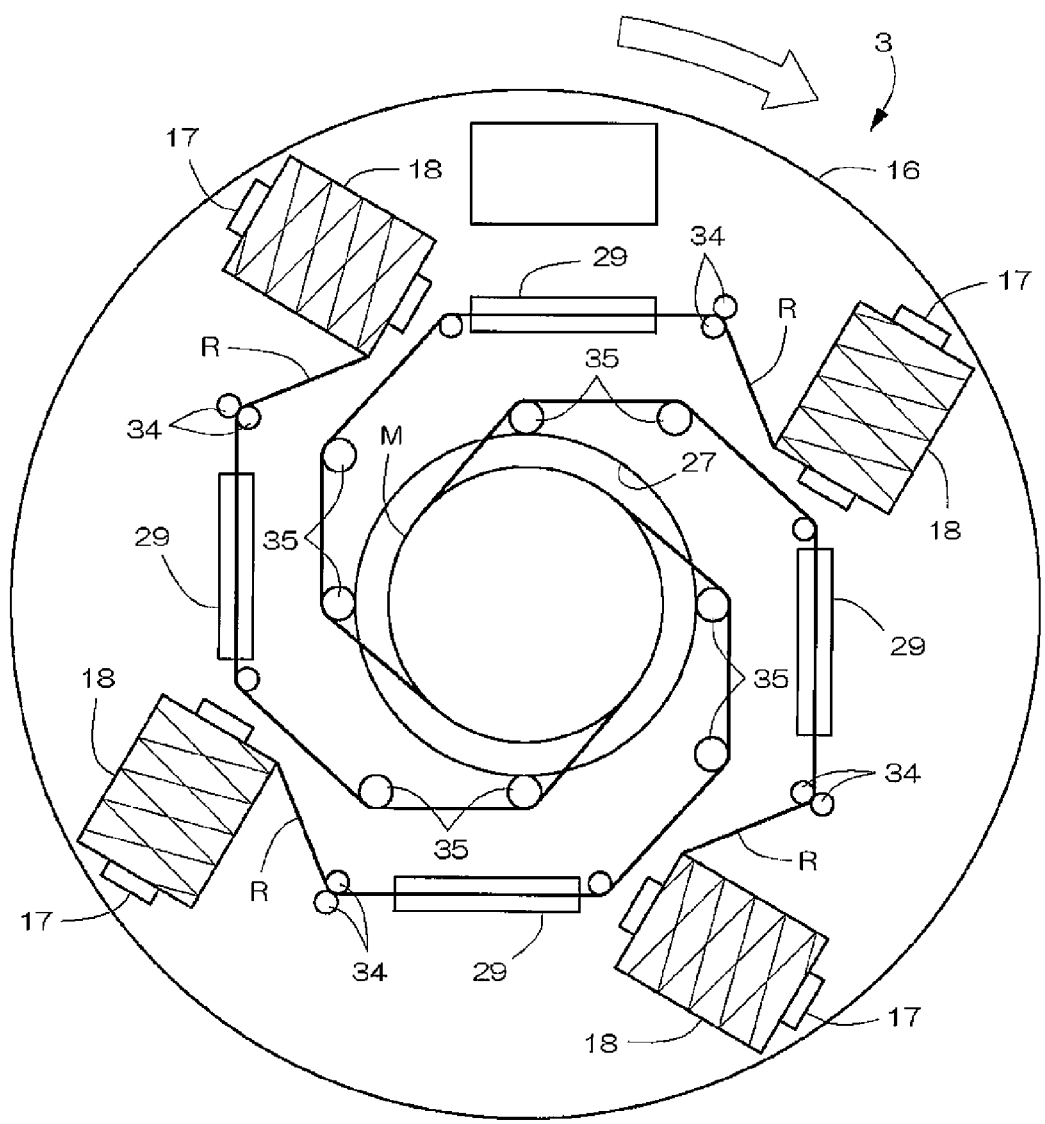
FIG. 9 is a side view showing another example of the hoop winding device.

FIG. 9 shows another example of the hoop winding device. In this example, the path of the fiber bundle R from each bobbin 18 to the mandrel M is formed as an independent movement path of spiral form, and the path length of the fiber bundle R in each movement path is made the same. The preparation unit 29 is arranged at a location adjacent to the introducing roller 34, so that the processing conditions of the fiber bundle R in each movement path are the same. The roller unit 36 is omitted. Other configurations are the same as the previous example, and thus same reference numerals are denoted for the same members and the description thereof is omitted.

In the above-described example, the resin application device 31 and the resin adhesion sensor 32 are arranged on the movement path of the fiber bundle R from the bobbin 18 to the mandrel M, but do not need to be arranged in such manner, and the fiber bundle R impregnated with thermosetting resin in advance may be supplied from the bobbin 18, similar to the fiber bundle R supplied to the helical winding device 4. The hoop winding process can be effectively carried out by arranging two or more, and more preferably, four or more bobbins 18.

While the present invention has been described with respect to embodiments thereof, it will be apparent to those skilled in the art that the disclosed invention may be modified in numerous ways and may assume many embodiments other than those specifically set out and described above. Accordingly, the appended claims cover all modifications that fall within the true spirit and scope of the present invention.

What is claimed is:

1. A filament winding apparatus equipped with a hoop winding device, the hoop winding device comprising:

a rotatably-driven disc-shaped wrapping table;

a plurality of bobbins supported along a peripheral edge of the wrapping table; and a guide member for moving and guiding a fiber bundle fed from the bobbins to a mandrel arranged in an insertion hole of the wrapping table, wherein the bobbins are arranged at equal intervals on a circumference having a center of rotation of the wrapping table as a center, a tensor for adjusting a tensile force of the fiber bundle is arranged on the wrapping table facing a movement path of the fiber bundle between the bobbins and the mandrel, and an application device for applying resin to the fiber bundle and an adhesion sensor for detecting an adhesion state of the resin on the fiber bundle are arranged on the wrapping table facing the movement path of the fiber bundle between the tensor and the mandrel.

2. The filament winding apparatus according to claim 1, wherein the guide member comprises rollers that surround a periphery of the insertion hole in a spiral form, and that turn and guide the fiber bundle fed from each bobbin.

3. The filament winding apparatus according to claim 2, wherein the rollers comprise an introducing roller and a group of guide rollers.

4. The filament winding apparatus according to claim 2, wherein the guide member further comprises a roller unit that moves and guides the fiber bundle towards the mandrel in a parallel orientation.

5. A filament winding apparatus equipped with a hoop winding device, the hoop winding device comprising:

a rotatably-driven disc-shaped wrapping table;

a plurality of bobbins supported along a peripheral edge of the wrapping table; and a guide member for moving and guiding a fiber bundle fed from the bobbins to a mandrel arranged in an insertion hole of the wrapping table, wherein each bobbin is supported by a holder comprising:

a fixed arm fixed to the wrapping table;

a moveable arm supported in a freely reciprocating manner on a slide board fixed to the wrapping table; and an upper chuck attached to the moveable arm and a lower chuck attached to the fixed arm.

6. The filament winding apparatus according to claim 5, wherein the chucks are axially supported in a freely rotating manner by the fixed arm and the moveable arm by a supporting shaft and a bearing, such that a winding core of the bobbin is sandwiched by the chucks.

7. A filament winding apparatus equipped with a hoop winding device, the hoop winding device comprising:

a rotatably-driven disc-shaped wrapping table;

a plurality of bobbins supported along a peripheral edge of the wrapping table; and a guide member for moving and guiding a fiber bundle fed from the bobbins to a mandrel arranged in an insertion hole of the wrapping table, and further comprising a ratchet mechanism that prevents the bobbins from overly rotating a direction of feeding the fiber bundle.

8. The filament winding apparatus according to claim 7, wherein
 each bobbin is supported by a holder comprising:
  a fixed arm fixed to the wrapping table;
  a moveable arm supported in a freely reciprocating manner on a slide board fixed to the wrapping table; and
  an upper chuck attached to the moveable arm and a lower chuck attached to the fixed arm, and
 the ratchet mechanism is arranged between the moveable arm and the upper chuck.

9. The filament winding apparatus according to claim 8, wherein the ratchet mechanism comprises:
 a ratchet wheel having ratchet teeth that rotates with the upper chuck;
 a ratchet nail that is axially supported in a pivoting manner by the moveable arm; and
 a first spring that pivots and biases the ratchet nail towards the ratchet wheel to engage the ratchet teeth.

10. The filament winding apparatus according to claim 9, further comprising:
 an L-shaped guide lever that is axially supported in a pivoting manner with a chuck shaft and that is pivot biased against a second spring to disengage the ratchet nail against the biasing force of the first spring; and
 a guide roller that is axially supported at a distal end of one arm of the guide lever, wherein the fiber bundle fed from the bobbin is wrapped around the guide roller and then fed out.

11. The filament winding apparatus according to claim 10, wherein, when the guide lever is pivoted against the biasing force of the second spring, an interlock arm of the guide lever displaces a pin arranged on the ratchet nail such that the engagement of the ratchet nail with the ratchet teeth is released, the bobbin can be rotated, and the fiber bundle can be fed out.

* * * * *